United States Patent [19]
Crandall et al.

[11] 3,773,391
[45] Nov. 20, 1973

[54] AIR CONVEYOR

[75] Inventors: Robert E. Crandall, Greendale; Glenn J. Eggert, Cedarburg, both of Wis.

[73] Assignee: Rex Chainbelt Inc., Milwaukee, Wis.

[22] Filed: Sept. 7, 1971

[21] Appl. No.: 178,058

[52] U.S. Cl. ............................................. 302/31
[51] Int. Cl. ......................................... B65g 53/04
[58] Field of Search ............................. 302/29, 31

[56] References Cited
UNITED STATES PATENTS

| | | | |
|---|---|---|---|
| 2,805,898 | 9/1957 | Willis, Jr. | 302/29 |
| 3,647,266 | 3/1972 | Hurd et al. | 302/31 |
| 1,900,781 | 3/1933 | Wardley | 302/31 |
| 3,180,688 | 4/1965 | Futer | 302/29 |

FOREIGN PATENTS OR APPLICATIONS

| | | | |
|---|---|---|---|
| 584,852 | 9/1933 | Germany | 302/31 |
| 1,136,642 | 9/1962 | Germany | 302/29 |

Primary Examiner—Evon C. Blunk
Assistant Examiner—H. S. Lane
Attorney—Joseph J. Jochman, Jr.

[57] ABSTRACT

A conveyor employing a gaseous conveying medium has a modular conveyor deck that provides wide adaptability to materials which may be conveyed, regulation of material flow, and the shape and extent of the conveyor deck. Each conveyor deck module has a combination of orifices to provide the precise gas flow characteristics desired at any point along the deck. The modules may be adjusted, altered, or replaced to modify the conveyor for changes in material being conveyed or the flow pattern thereof.

3 Claims, 4 Drawing Figures

PATENTED NOV 20 1973
3,773,391
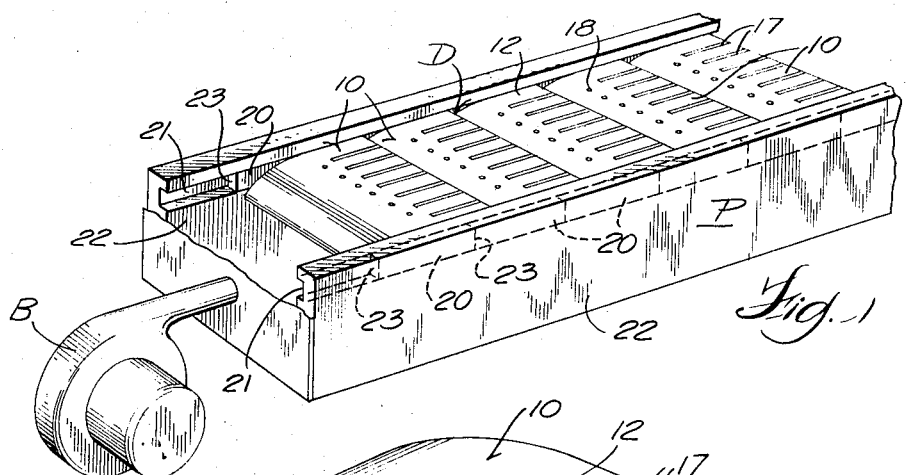
Fig. 1
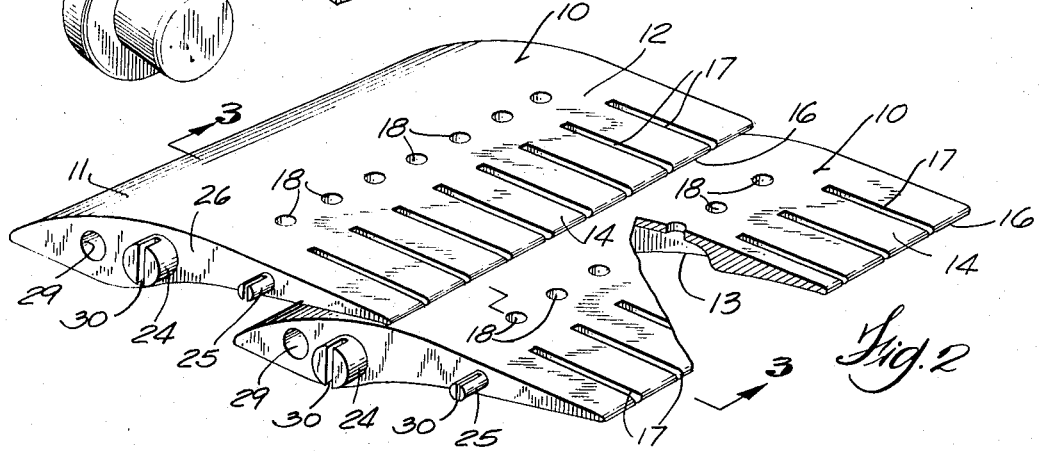
Fig. 2
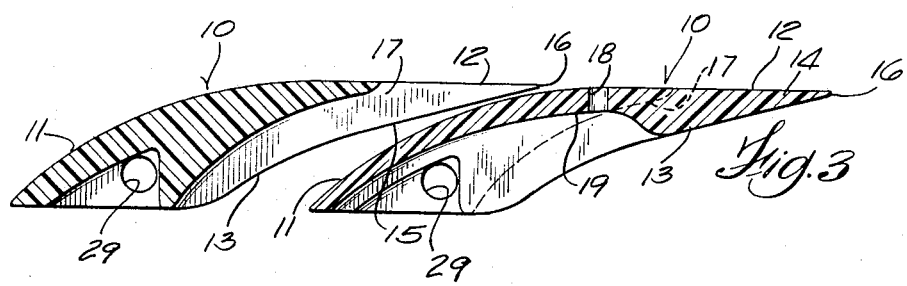
Fig. 3
Fig. 4
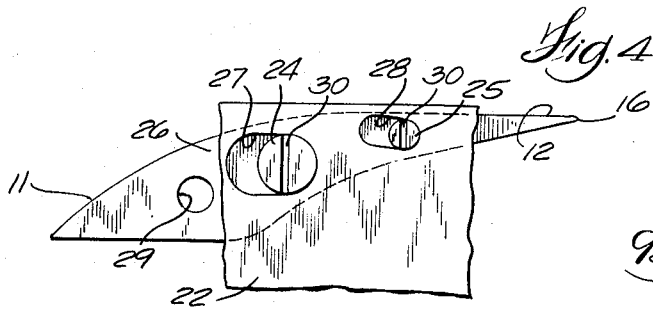
Inventors
Robert E. Crandall
Glenn J. Eggert
By Joseph J. Cochran Jr.
Attorney

AIR CONVEYOR

BACKGROUND OF THE INVENTION

1. Field of the Invention

The present invention pertains to the art of conveyors of the type wherein material is supported and conveyed by a fluid under pressure. More particularly, this invention concerns improvements in the conveying deck of such a conveyor in which the conveying medium is a gas.

2. Description of the Prior Art.

Air conveyors are well known in the art and are used to convey a variety of materials, including both solid bulk material and unit packages of relatively low density. The compressed air or other gas used as the conveying medium may also be used to process the material being conveyed as, for example, by heating, cooling, or drying it.

Prior art air conveyors have been of relatively simple construction and generally comprise a plenum chamber in communication with a source of compressed air or other gas. One side of the plenum, usually the top side, forms the deck of the conveyor or the surface over which material is conveyed. The deck is provided with openings which act as nozzles or orifices to provide controlled escape of air from the plenum to support and convey material along the deck.

It is known to provide the decks of air conveyors with a variety of sizes, shapes and arrangements of openings to accomodate various kinds of materials and to convey them at different speeds. The most common type of deck openings comprise transverse slots or vanes arranged in spaced parallel relation along the length of the conveyor. Such slots are shown, for example, in U.S. Pat. No. 545,013. The slots generally include surface portions set at an acute angle to the surface of the deck such that the stream of compressed gas from the plenum chamber passing through the slots has a vertical and a horizontal component to provide, respectively, a lifting and a conveying force to material on the deck.

It has been found that transverse slots alone are not adequate to effectively convey all the types of materials capable of being transported on an air conveyor. It is, therefore, known to provide the deck with holes of relatively small diameter and disposed perpendicularly or at varying acute angles to the deck surface. These holes may be used where added lifting force is required, which is often the case in conveying particulate material, but may also be used to provide a conveying force component. Examples of such applications are shown in U.S. Pat. Nos. 898,775 and 2,805,898.

A combination of slots and holes has been found effective in certain applications, and it is known to vary the position, spacing and angle of inclination of either or both along the length of a conveyor deck to accomodate varying flow conditions or to effect variations in velocity or volume of the material being conveyed, as shown in U.S. Pat. No. 3,180,688.

U.S. Pat. No. 2,882,097 shows a modular vane construction wherein identical unitary vane members are placed in parallel abutting relation to form a slotted conveyor deck. This patent further teaches that the longitudinal spacing between adjacent vanes may be varied to regulate the air flow therebetween and, to some extent, the effect on the material being conveyed. The effects of such regulation are, however, quite limited because the resultant force created by the air flow always acts in the same direction.

It is apparent from the prior art that effective conveying of different kinds of materials requires the use of a combination of orifices in the deck. Further, particular and varying arrangements of the orifices are often necessary along the length of the conveyor to provide the desired flow or to otherwise control the material being conveyed.

Air conveyors of the prior art are in general designed and built to convey a single type of material in a particular manner. It is therefore, usually difficult or expensive to effectively adapt an existing conveyor to handle a different material. Similar difficulties result in attempts to change the pattern of material flow along the length of such a conveyor. It is known to provide some control to the flow of material by changing the volume or pressure of air delivered to the plenum chamber. Mechanical means such as baffles and gates may also be used to effect some control of the flow. Such controls are, for the most part, either impractical or limited in their effectiveness.

The difficulties in changing an initially established flow pattern arise primarily from the unitary structure of the deck of the conveyor wherein the orifices are stamped, cut, or otherwise formed in a single sheet of metal or other material. The sheet forms the conveyor deck surface and modification of the sheet to suit desired changes in the material or manner of conveying it may require substantial alterations or even replacement of the sheet. The impracticability of such alterations may often preclude them entirely.

SUMMARY OF THE INVENTION

The present invention provides a single basic modular conveyor deck member which can be used in multiples to provide the exact type of deck required for any one of a wide variety of applications. The modules are constructed to provide effective conveying of a wide range of kinds of materials and may be subjected to certain adjustments and modifications to provide desired special conditions at any point along the conveyor path.

The deck modules provide an optimum combination of vanes, slots and apertures found to be best suited to convey the widest variety of materials.

The modules may be used to form a curved or inclined deck which may have a single or multiple row width. The deck may be readily adjusted or modified to provide at any point the appropriate combination of horizontal and vertical forces to control the flow as desired.

BRIEF DESCRIPTION OF THE DRAWING

FIG. 1 is a perspective view of an air conveyor employing a deck formed of modules of the present invention.

FIG. 2 is a perspective view of two deck modules of the present invention shown in operative association.

FIG. 3 is a sectional view taken on line 3—3 of FIG. 2.

FIG. 4 is a side view of a deck module showing an alternate means of mounting and adjusting same.

DESCRIPTION OF THE PREFERRED EMBODIMENTS

Referring to FIG. 1, an air conveyor may be of relatively simple construction and include a plenum chamber P to which is attached a source of compressed air, such as blower B. Suitable gases other than air may also be used and the temperature, humidity, or other properties of the gas may be appropriately regulated to process as well as convey the material.

The conveyor deck D forms the top side of the plenum P. The material is conveyed over the deck on a cushion of gas escaping from the plenum chamber P through a series of orifices in the deck D. All or some of the orifices are oriented in a manner to provide a component of force in the direction longitudinally of the deck to move the material or articles thereover.

The air conveyor deck D constructed in accordance with the present invention includes a series of individual deck modules 10. The modules may be made of a variety of materials including metals, plastic and ceramics, and may be formed in any suitable manner, such as molding, stamping, forging or casting.

Each module 10 has an upper surface that includes an upwardly curving convex rear portion 11 and a substantially flat forward portion 12. The concave lower surface 13 of each module is also upwardly curved and converges with the upper surface to form a narrow-edged vane 14.

As may be seen particularly in FIGS. 2 and 3, adjacent modules 10 are operatively positioned such that the concave lower surface 13 of a module 10 overlaps the convex rear portion 11 of the forwardly adjacent module. In this position, the surfaces 11 and 13 of adjacent modules are upwardly and forwardly convergent to form a nozzle 15 terminating in an orifice at the edge 16 of the vane 14.

Because of the overlapping relation of the positioned modules 10, the exposed upper surface of the conveyor deck is substantially flat and comprises a series of flat portions 12 separated by the vane edges 16. Within each flat surface portion 12 and extending rearwardly from the edge 16 are a number of longitudinally extending, laterally spaced slots 17. The slots extend through the vane 14 to provide open communication between the lower surface 13 of each module 10 and the flat deck surface. Also within the flat deck surface 12 and approximately mid-way between the slots 17 of adjacent modules are a number of laterally spaced apertures 18. The apertures extend through the module into communication with undercut portions 19 in the underside of the module.

It has been found that the above described combination of vanes 14, slots 17 and apertures 18 operates to convey the widest range of articles and materials in the most effective and efficient manner. The compressed air or other gas is allowed to escape from the plenum chamber P simultaneously through all of the orifices. The vanes 14 direct an air flow at a low acute angle to the deck surface. The angle should be the minimum practically attainable in order to provide a substantial longitudinal force component. This component provides the principal conveying force.

The apertures 18 are adapted to direct an air flow substantially perpendicularly to the deck surface. The principally vertical component produced thereby provides most of the necessary lifting force. The slots 17 direct a flow of air at an angle intermediate the flow angles from the vanes and apertures, and this intermediate flow contributes a component to both the primary conveying and lifting forces.

As mentioned previously, different materials are variously affected by the air flow through the orifices in the deck. Thus, it has been found that the vanes 14 are particularly suited to conveying packages, because their support does not require a substantial vertical component of force. Bulk solid or particulate materials, on the other hand, require a substantial vertical supporting force, such as is provided by the apertures 18. The slots 17 have been found to be particularly effective in bouying up or "fluidizing" a bed of particulate material on the deck. The slots also provide a longitudinal force component which may be the primary conveying force or which may be supplemental to a primary force provided by the vanes 14, as will be explained in greater detail below. Varying combinations of horizontal and vertical force components of the air flow are also needed to accelerate or decelerate the material or to move the material up or down an inclined deck.

Direct control of the horizontal and vertical forces may be attained by adjustment and modification of deck modules 10. Referring to FIG. 1, each module has a pair of mounting shoes 20 attached to its lateral edges. The shoes 20 are adapted to be slidably received in mounting grooves 21 forming the upper edges of the sides 22 of the plenum chamber P. The shoes may be formed integrally with the modules and may be dimensioned so that their forward and rear edges 23 engage and abut like edges of the shoes of adjacent modules similarly mounted in the grooves 21 in a manner to provide whatever size orifice is desired for the nozzle 15 (see FIG. 3). The mounting shoes 20 may be made of a size such that when their forward edges 23 engage the rearward edges of the forwardly disposed module, the nozzle 15 is closed; i.e. the forward edge 16 of the vane 14 is in full line contact with the rear portion 11 of the forwardly adjacent module. If it is desired to open the nozzle 15, suitable shims may be placed between the edges 23 of adjacent shoes 20 or the modules may be replaced with one having mounting shoes dimensioned to provide the opening desired and thereby control the primary conveying force.

Referring to FIG. 4, an alternate means for mounting the deck modules 10 and varying their positions relative to each other includes a pair of trunnions 24 and 25 extending laterally from the face 26 of one edge of the module. The mounting grooves 21 in one side 22 of the plenum P in FIG. 1 are replaced with a pair of adjustment slots 27 and 28 for each module. Trunnions 24 and 25 are slidably received in slots 27 and 28, respectively, for longitudinal adjustment of the modules. One of the adjustment slots, such as 28, is inclined slightly so that simultaneous longitudinal movement of adjacent modules will vary the orifice opening along the edge 16 of the vane 14.

The faces 26 of both module edges may be provided with aligned through bores 29 for receipt of means (not shown) for tying the modules together to provide simultaneous uniform movement and to provide support for the edge opposite the trunnions in a mounting groove 21 or the like. This opposite edge may also be provided with a pair of holes (not shown) positioned and dimensioned to receive the trunnions of a laterally adjacent module, whereby the deck width of a conveyor may be increased as desired. Correspondingly, the trunnions may be formed with notches 30 such that, upon insertion into the holes in an adjacent module, they may be more firmly held by the resilience of module material.

In order to provide control of the components of force provided by the slots 17 or apertures 18, the modules may be made, as by molding, with the slots and apertures closed. The molds may be formed to provide grooves defining both the slots and the apertures in the modules such that these portions may be knocked or punched out to selectively open the apertures and/or slots as required, all in a manner known in the molding art.

It can be seen that a deck D may be made of modules 10 of the present invention so as to selectively provide the horizontal conveying and/or the vertical supporting forces to suit the type of material to be conveyed and the manner in which it is to be moved. In addition, changes in the material or in the manner in which it is conveyed can be readily made.

We claim:

1. In an air conveyor including a plenum chamber operatively connected to a supply of compressed air, said chamber including a conveying deck, a modular deck member for serial mounting with similar deck members to provide said deck comprising a vane providing an air flow having a resultant force acting substantially horizontal to said deck, a number of laterally spaced apertures providing an air flow having a resultant force acting substantially perpendicular to said deck, a number of laterally spaced slots providing an air flow having a resultant force acting intermediate the resultant forces from said vane and said apertures, and means for varying the position of the deck member with respect to adjacent deck members to selectively activate said vane.

2. The invention of claim 1 including plenum chamber sides for supporting the deck and wherein the means for varying the position of the deck member comprises adjustment slots in the sides of the plenum and integral lateral mounting extensions on the deck member adapted to be slidably received in said adjustment slots.

3. In an air conveyor having an air supply plenum and a conveying deck, a modular member for serial mounting with similar members to provide said conveying deck comprising a vane adapted to provide a first air flow having a resultant force acting substantially parallel to the conveyor deck, aperture means disposed rearwardly of said vane and adapted to provide a second air flow having a resultant force acting substantially perpendicular to the deck, slot means intermediate said vane and said aperture means and adapted to provide a third air flow having a resultant force acting intermediate the resultants of said first and second air flows, and means integral with said member for varying the position thereof with respect to adjacent members to selectively effect said first air flow.

* * * * *

UNITED STATES PATENT OFFICE
CERTIFICATE OF CORRECTION

Patent No. 3,773,391  Dated November 20, 1973

Inventor(s) Robert E. Crandall et al.

It is certified that error appears in the above-identified patent and that said Letters Patent are hereby corrected as shown below:

On the cover sheet item [73] "Rex Chainbelt Inc."

should read -- Rexnord, Inc. --.

Signed and sealed this 1st day of October 1974.

(SEAL)
Attest:

McCOY M. GIBSON JR.
Attesting Officer

C. MARSHALL DANN
Commissioner of Patents